(12) United States Patent
Kuiper et al.

(10) Patent No.: US 7,679,833 B2
(45) Date of Patent: Mar. 16, 2010

(54) ELECTROWETTING ELEMENT, LENS SYSTEM, ELECTRONIC DEVICE AND DRIVING METHOD

(75) Inventors: Stein Kuiper, Eindhoven (NL); Bernardus Hendrikus Wilhelmus Hendriks, Eindhoven (NL); Christina Adriana Renders, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 11/914,782

(22) PCT Filed: May 16, 2006

(86) PCT No.: PCT/IB2006/051528

§ 371 (c)(1),
(2), (4) Date: Nov. 19, 2007

(87) PCT Pub. No.: WO2006/123288

PCT Pub. Date: Nov. 23, 2006

(65) Prior Publication Data

US 2008/0204890 A1 Aug. 28, 2008

(30) Foreign Application Priority Data

May 20, 2005 (EP) .................... 05104315

(51) Int. Cl.
*G02B 1/06* (2006.01)
(52) U.S. Cl. .................. 359/665; 359/666; 359/900
(58) Field of Classification Search ................ 359/665, 359/666, 900
See application file for complete search history.

(56) References Cited

U.S. PATENT DOCUMENTS

| 7,224,534 B2 * | 5/2007 | Ootsuka et al. ............. 359/665 |
| 7,256,943 B1 * | 8/2007 | Kobrin et al. ............... 359/666 |
| 2002/0176148 A1 | 11/2002 | Onuki et al. |

FOREIGN PATENT DOCUMENTS

| WO | 03069380 A1 | 8/2003 |
| WO | 2004038480 A1 | 5/2004 |
| WO | 2004099830 A1 | 11/2004 |
| WO | 2004099844 A1 | 11/2004 |
| WO | 2004099847 | 11/2004 |
| WO | 2005076069 A1 | 8/2005 |
| WO | 2006054209 A1 | 5/2006 |

* cited by examiner

*Primary Examiner*—Jack Dinh (57) ABSTRACT

The electrowetting optical element comprises a first electrically conducting fluid and a second electrically insulating fluid. According to the invention the second fluid comprises a compound including an aliphatic ring-structure. The optical element may be a lens or a zoomlens or be part of a zoomlens system.

13 Claims, 4 Drawing Sheets

ELECTROWETTING ELEMENT, LENS SYSTEM, ELECTRONIC DEVICE AND DRIVING METHOD

The invention relates to an electrowetting optical element comprising a fluid chamber with a first, electrically susceptible fluid and a second, electrically less susceptible fluid, which fluids are mutually at least substantially immiscible and separated over a meniscus.

The invention also relates to a lens system comprising such an electrowetting optical element acting as a lens, and to an electronic device comprising the electrowetting optical element or the lens system.

The invention further relates to a method of driving a lens system.

Such an optical element is for instance known from US-A 2002/0176148. The known element is a lens and comprises a closed fluid chamber with a salt solution as the first fluid and a silicone oil as the second fluid. These electrowetting lenses are capable of varying their focus due to small amounts of electric power since no mechanical movable parts are required. Other examples of electrowetting optical elements include diaphragms, color filters, displays, prisms, beam deflectors, filters for X-ray equipment and the like.

The operation of electrowetting elements is based thereon that an electrode is separated from the fluid chamber by an apolar surface. Since the first fluid is more susceptible to an electrical field than the second fluid, movements of the fluids can be induced. The first fluid will move towards this electrode and wet the apolar surface only under application of a voltage difference between the electrode and the first, electrically susceptible fluid. This movement of the first fluid, and consequently also of the second fluid, induces changes in the shape of the meniscus.

The proper operation of the electrowetting element is dependent on the properties of the fluids. First of all, there need to be a difference in electrical susceptibility to an electric field. The first fluid is for instance electrically conductive, while the second fluid is electrically insulating. Alternatively, the first fluid comprises a polar material, whereas the second fluid comprises an apolar material.

For a lens, f.i., it is needed that the refractive indices of the first and the second fluid are different. In order that the orientation of the lens does not influence the shape of the meniscus, it is preferable that the density of the fluids is similar or even the same. Therefore, the first fluid in the prior art element, as disclosed in paragraph 84 and FIG. 2, the salt solution, has a refractive index of 1.38 and a density of 1.06 kg/l. The second fluid has a refractive index of 1.49 and a density of 1.06 kg/l. This difference in refractive index results in a lens with a proper optical power.

However, it has turned out that many electrowetting lenses do not function properly over the full width of the lens, as a consequence of chromatic aberration. This aberration is the result that the refractive index is dependent on the wavelength of the radiation. Hence, the optical power depends on the wavelength. This problem is well-known in the field of optics, but its solution is more difficult for electrowetting lenses, since these lenses change their optical power from positive to negative depending on the radius of the meniscus. As a result the contribution to the chromatic aberration is not fixed as in conventional lenses but changes when changing the optical power of the lens. This problem of chromatic aberration turns up in zoom lenses especially, as the requirements on optical power for zoom lenses limit the choice of suitable fluids. It is however also relevant for single electrowetting lenses. Chromatic aberration can be limited by increasing the diaphragm—i.e. making the aperture for passage of light smaller. The diaphragm is simultaneously used for tuning the amount of light entering into the lens. An increase in the diaphragm to limited chromatic aberration thus sets a higher limit for the light intensity needed to make a proper photograph.

It is therefore an object of the invention to provide an electrowetting element of the kind described in the opening paragraph with an adequate optical power and a limited chromatic aberration, which element nevertheless fulfils mechanical stability requirements.

This object is achieved in that the second fluid comprises a compound that includes an aliphatic ring-shaped structure. This class of materials turns out to have a higher refractive index (leading to higher optical power) while the chromatic aberration properties are similar to or smaller than corresponding materials without a ring-shaped structure. This is surprising in that generally, the dispersion increases with an increase in the refractive index. The dispersive effects are generally expressed with the Abbe number, which is a measure of the wavelength dependence of the refractive index. It is defined as $$V = \frac{n_d - 1}{n_F - n_C}$$

where $n_d$, $n_F$, and $n_C$ are the indices of refraction for the helium d-line (587.6 nm), the hydrogen F-line (486.1 nm) and the hydrogen C-line (656.3 nm). A low value of V corresponds to strong dependence of the refractive index on the wavelength, while a high value indicates a low dependence on the wavelength.

As can be deduced from the results listed in table 1, the compounds with ring-shaped structures, such as cyclohexane and cis-decaline, have a similar Abbe number as their equivalents without ring-shaped structure, i.e. n-hexane and n-decane, while simultaneously, the optical power is enhanced. Additionally, it is found that the density of the compounds with ring-shaped structures is substantially higher than those without ring-shaped structure. Thus, while the simple non-cyclic aliphatic compounds were practically inapplicable as a consequence of the low density, the aliphatic compounds with ring-shaped structure are.

In the context of the present application, the term 'compounds with an aliphatic ring-shaped structure' refers to partially or completely cyclic compounds, and wherein the ring is non-aromatic, i.e. without delocalised electrons. Preferably it is free of any double or triple bond and includes only saturated bonds, such as C—O, Si—O and C—C— bonds. It is herein not excluded that the compounds include unsaturated bonds, although compounds merely having saturated bonds are preferred. The compounds may have a chain including one or more heteroatoms such as Si (siloxanes) or O (esters, ethers). In the case of siloxanes, the ring-shaped structure may even be built up from —O—($R^2$)Si($R^1$)— units, in which $R^1$, $R^2$ are in particular alkyl groups, such as methyl or ethyl. Also this ring-shaped structure appears suitably described as an aliphatic structure, as the bonds are localized and single, and as the ring-shaped structure is not rigid but allows several molecular conformations.

Advantageously, the compound with the aliphatic ring-shaped structure is an alkane. The apolarity of alkanes is appropriate and the refractive index of these compounds is relatively high, i.e. higher than 1.40. Polycyclic aliphatics are even more advantageous, in view of their refractive index of more than 1.45, in combination with an appropriate density and an appropriate Abbe number of more than 50, or even more than 55.

It is observed that a silicone oil of the prior art also has a refractive index of more than 1.40. A silicone oil with a refractive index of 1.49 and a density of 1.06 kg/l is for instance Dow Corning's DC550. This silicone oil has a viscosity of 125 mm$^2$/s, as compared to 1 mm$^2$/s for water. Such a viscosity effectively substantially reduces the switching speed of the lens. Cyclohexane on the other hand has a viscosity of 0.894 mPas (data of Merck). Moreover and even more important, the refractive index and density suggest the presence of phenyl-groups in the silicone oil network. This type of silicone oil however has a very low Abbe number, which makes it unsuitable for use in zoomlenses.

Preferably, the compound is a saturated compound. Non-saturated compounds are found to reduce the Abbe number and thus increase problems with chromatic aberration. It was found that for electrowetting elements achromatisation occurs if $$\frac{V_1(n_{d,2}-1)}{V_2(n_{d,1}-1)} = 1 \quad (1)$$

Herein, V is the Abbe number and $n_d$ is the refractive index at a wavelength of 587.6 nm, and the subscripts refer to the fluids. As is clear from the data in table 1, the saturated compounds have a value that is nearer to 1.0 than their unsaturated equivalents. This is particularly important for elements or systems wherein large differences between the refractive indices are desired or required, such as zoom lenses. In that elements or systems, it has turned out very difficult to achieve complete achromisation.

In a further embodiment, the compound is substituted with one or more groups. Suitable substitutions include halogens, carbonyl groups, acetals, sulfoxy ($SO_3$), sulfuric ($SO_2$), sulfide, nitro. Advantageously, the substitutions do not introduce a substantial polarity, as a polar molecule in the second fluid reacts on the applied voltage in electrowetting. This results in worse electrowetting performance. Therefore, the substitutions are suitably provided in a symmetric manner. Symmetric substitutions of polar groups are considered to be most suitable. Halogens appear suitable substitutions in view of their ability of increasing density, but have the disadvantage of being environmentally undesired.

The compound with the aliphatic ring-structure may be present either as main component but also mixed with or dissolved in another fluid. This is particularly interesting for such compounds that are themselves not fluid over the whole range of temperatures in which the electrowetting element should function. This range extends for lenses in mobile phones generally from below 0° C. to up to 50° C., or even from below −30° C. to up to 70° C. Suitably, the compound with the aliphatic ring-structure is present in an amount from 1 to 80% by weight, preferably from 5 to 50% by weight, and more preferably between 8 and 25% by weight. In addition to an increase of the refractive index, this mixing can decrease the viscosity of the second fluid. That is suitable so as to reduce the switching time of the meniscus.

A most preferred example of a mixture is one in which each of the mixed compounds has another property: one has a high Abbe number of more than 50, another has a large refractive index of more than 1.40 and a third has a large density.

Suitable compounds include cycloalkanes, such as cyclopentane, cyclohexane, cycloheptane, cyclooctane; alkylsubstituted cycloalkanes, such as methyl-, ethyl-, n-propyl-, iso-propyl-cyclohexane, and also cyclohexyl-cyclohexane; bicycloalkanes, such as cis-decaline, trans-decaline, bicyclohexane, bicyclopentane, bicyclobutane, perhydrofluorene, perhydronaphtalene; other polycyclic aliphatics, such as propellane ($C_5H_6$), housane ($C_5H_8$), cubane ($C_8H_8$), methylcubane ($C_9H_{10}$), rotane, tetrahedrane ($C_4H_4$), triprismane ($C_6H_6$), spiroheptane ($C_7H_{12}$), norbornane, squalane adamantane. Also crown-ethers may be applied.

The use of the polycyclic aliphatics is particularly preferred in a solution or mixture. Most suitably, the solvent is itself a cyclic compound. Specific examples of solutions/mixtures include cis-decaline in cyclohexane, 10-20% cubane in hexane or cyclohexane, 5-15% adamantane in cyclooctane or perhydronaphtalene.

Other suitable compounds are cyclic siloxanes, such as hexamethyl-cyclotrisiloxane, dodecamethylcyclohexasiloxane and octamethylcyclotetrasiloxane. The hexamethylcyclotrisiloxane is particularly suitable as a dissolved compound, in view of the melting temperature of 65° C. Substitution of methyl-groups in these siloxanes by cyclic groups, e.g. cyclohexane, leads to an even higher refractive index, while keeping the Abbe number high.

Suitably, the second fluid further comprises a surfactant. This reduces the driving voltage needed, and operates between the second fluid and the wall of the fluid chamber, or between both fluids. Suitable surfactants include f.i. pentafluorotrimethylsilane, trifluoromethyltrimethylsilane, octanol, trifluoromethyltriethylsilane.

The first fluid of the electrowetting component of the invention is particularly a salt solution, particularly of chloride salts such as sodium chloride, potassium chloride or in particular lithium chloride. The introduction of salts in water generally tend to increase the refractive index, and therefore reduce the difference in refractive indices between the first and the second fluid. When using chloride salts, this increase in refractive index is relatively limited. These salts may therefore be added in amounts sufficient to provide not only the required electrical susceptibility, but also a depression of the freezing point, so as to allow use of the elements at low temperatures. Alternatively, one may for instance use a salt solution of limited concentration and add a further compound for freezing point depression. A suitable concentration of the salt solution is particularly of 1 mol/liter or less than 0.5 mol/liter or even less than 0.2 mol/liter. Suitable compounds for freezing point depression are for instance alcohols, particularly the lower aliphatic alcohols. One example is methanol.

Preferably, the electrowetting component of the invention is a zoomlens or is part of a lens system acting as a zoomlens. The requirement of limited chromatic aberration with sufficient optical power is particularly important for zoom lenses. A specific electrowetting zoomlens is a lens including two menisci. Although these menisci may be present in a single fluid chamber, it is preferred for reasons of stability and standardized manufacture to use two fluid chambers in series within the light path. In addition to an ordinary electrowetting lens, use can be made of binary electrowetting lenses, such as disclosed in WO-A 2004/38480. Instead of the use of two electrowetting lenses, it is not excluded that the zoomlens comprises only a single electrowetting lens. This single lens may be moved in conventional manner to achieve the zoom effect. A first Alternative is however that the second lens is a variable focus lens of an alternative type, such as a liquid crystalline lens. A second alternative is further that an additional lens of a conventional type, while a single electrowetting lens acts as the second lens.

The effect of chromatic aberrations in a zoom lens with a first electrowetting lens and a second variable focus lens may be further reduced with an appropriate driving mechanism. According to that mechanism, the menisci of both of the lenses are flat in a position halfway between the two extremities, i.e. that of a telelens and that of a wide-angle lens. By switching in such a manner that the menisci have the same curvature, but in opposite directions, the chromatic aberrations of both lenses can be cancelled, at least partially. Such switching need not be to be carried out for all intermediate positions between the halfway position and the wide-angle position or the teleposition. It may be sufficient to do this for the extreme positions only. Moreover, the knowledge of images in which the chromatic aberrations have been cancelled, may be used for error correction in an image sensor. This driving mechanism may be suitably applied with the electrowetting element of the invention, but is not limited to this specific element.

In the case that the electrowetting lens and the other variable focus lens in the zoomlens are identical, the position of the flat menisci is simply that halfway the two extremes. In the case that the lenses are different, the extreme positions may be chosen as those positions in which the chromatic aberrations of the two lenses substantially cancel each other. It appears preferable that the position of the flat menisci is in between of that of the wide-angle configuration and the half configuration, as the chromatic aberrations in the wide-angle configuration are generally larger.

The electrowetting element of the invention, or a lens system therewith, may be integrated with an image sensor, with light-emitting diodes or the like to form an optoelectronic subassembly. This again may be integrated into an electronic device such as a mobile phone, a microscope, a lighting device.

These and other aspects of the invention will be further elucidated with reference to the Figures, in which.

Equal reference numbers in different Figures refer to equal or alike parts. The Figures are purely diagrammatical and not drawn to scale.

Figure 1:
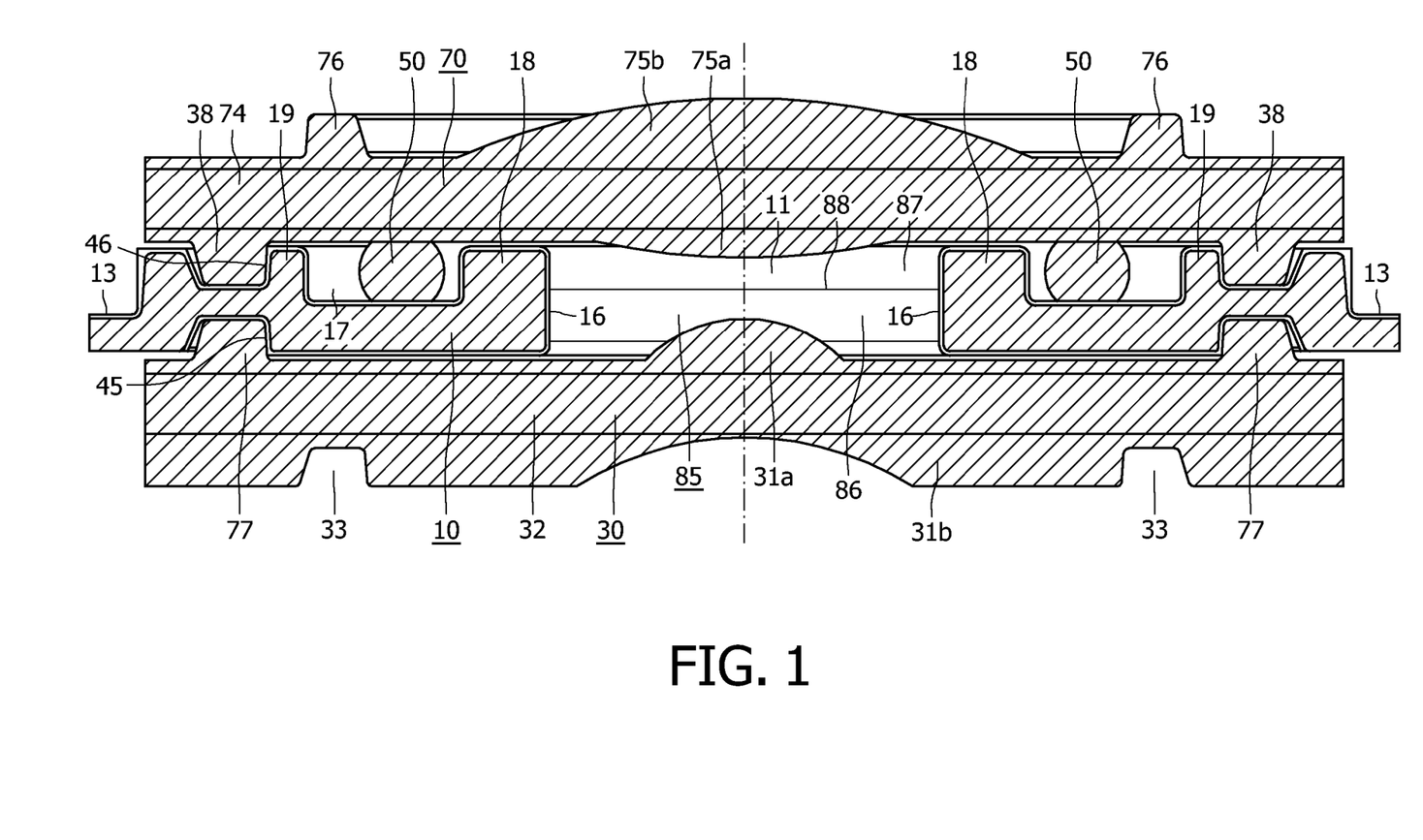
FIG. 1 is a diagrammatic cross-sectional view of the lens of the invention.

FIG. 1 diagrammatically shows a variable focus lens package 2 according to a preferred embodiment of the present invention.

The variable focus lens 2 comprises a plastic annular body 10, which is at least partially covered by a layer comprising electrically conducting material, such as metal. The electrically conducting layer is covered by a layer comprising an electrically insulating material, such as parylene, whereas the electrically insulating layer is covered by a layer comprising a hydrophobic material. The three layers covering a portion of the body 10 are diagrammatically depicted in FIG. 1 by means of a line, which is indicated by reference numeral 16.

The body 10 of the variable focus lens 2 comprises—bevelling—surfaces 13 which are located at an outer portion. Furthermore, at a bottom side, the body 10 is provided with an annular groove 17.

A through-hole 11 of the body 10 is closed off by means of a bottom lens member 30 which is located at the bottom side of the body 10 and a top lens member 70 which is located at the top side of the body 10. Both lens members 30, 70 are formed as so-called replica lenses. Such lenses comprise a glass base plate 32, 74 and a plastic lens bodies 31a. 31b, 75a, 75b, and are manufactured with a replica technique, with the use of a mould for moulding the plastic and UV-light for curing the plastic inside the mould, thus effecting cross-linking. Preferably the cross-linking density is at least 0.05 and preferably in the order of 0.08-0.15. The outer lens bodies 31b, 75b comprise alignment means 33, 76. These alignment means 33,76 are designed here to have an annular shape, but this is not necessary. In this example, the alignment means have the same height as the lens parts 75b, 31b, but that is by no means necessary; the moulding technique allows height variations as desired.

The variable focus lens 2 comprises a sealing ring 50 for sealing a fluid chamber 85 that is delimited by the body 10, a bottom surface of the top lens member 70 and a top surface of the bottom lens member 30. The sealing ring 50 is located between protruding annular portions 18, 19 of the body 10 and the base plate 74 of the top lens member 70. The design of the lens may be amended so as to include more than one sealing ring, if so desired.

At both the top surface 36 of the bottom lens member 30 and the bottom surface 76 of the top lens member 70, a positioning ring 38, 77 is arranged on the lens members 30, 70. The positioning rings 38, 77 play a role in aligning the lens members 30, 70 with respect to each other and with respect to the through-hole 11 of the body 10. On the one hand, an outer diameter of a bottom positioning ring 38 is chosen such that when the bottom lens member 30 is put in place with respect to the body 10, an outer circumference of the bottom positioning ring 38 contacts an outer wall 45 of the body 10, without the presence of play. In this way, a central axis of the lens body 31 of the bottom lens member 30 is exactly aligned with a central axis of the through-hole 11 of the body 10. On the other hand, an outer diameter of a top positioning ring 77 is chosen such that when the top lens member 70 is put in place with respect to the body 10, an outer circumference of the top positioning ring 77 contacts the upright wall 46, without the presence of play. In this way, a central axis of the lens body 75 of the top lens member 70 is exactly aligned with the central axis of the through-hole 11 of the body 10, and consequently also with the central axis of the lens body 31 of the bottom lens member 30.

For the purpose of fixing the various lens package elements 10, 30, 50, 60, 70, with respect to each other, clamping units can be used, which are however not depicted. A clamping unit is for instance arranged such as to clamp the top lens member 70 against the body 10, wherein the sealing ring 50 is clamped between the top lens member 70 and the body 10.

The variable focus lens 2 comprises a first fluid, for instance an aqueous salt solution, 86 and a second apolar fluid 87. The first fluid 86 and the second fluid 87 are present in the fluid chamber 85, wherein the first fluid 86 is situated at a bottom side of the fluid chamber 85, and wherein the second fluid 87 is situated at a top side of the fluid chamber 85. Other designs of the fluid chamber 85 are possible, in which the location of the first and second fluid are reversed, and the second fluid is shaped as a droplet. The first fluid 86 and the second fluid 87 are immiscible and separated by a meniscus 88. The shape of this meniscus 88 is variable under the influence of a voltage between the electrically conducting layer of the body 10 and the first fluid 86, as the wettability of the hydrophobic layer with respect to the salt solution is variable under the application of a voltage.

In experiments of the present invention, use was made of a 0.1 M KCl salt solution as the first liquid 86. This solution has a refractive index at 589 nm $n_D=1.3342$, and an Abbe number $V=57.6$. A number of fluids was tested as a second fluid 87, as shown in same composition. A diacrylate layer is suitable for the layer 31a and a HDDA replica is suitable for the layer 31b. The lenses are provided at the side of layer 31b with coatings, such

TABLE 1

| | Name | $n_D$ | $n_F$ | $n_C$ | V | $\rho$ (g/cm$^3$) | $n_{D1}$-$n_{D2}$ | $\dfrac{V_1(n_{D,2}-1)}{V_2(n_{D,1}-1)}$ | Structural formula |
|---|---|---|---|---|---|---|---|---|---|
| A1 | n-Hexane | 1.3745 | 1.3790 | 1.3725 | 57.6 | 0.659 | 0.0403 | 1.12 | $C_6H_{14}$ |
| A2 | Cyclohexane | 1.4259 | 1.4310 | 1.4235 | 56.8 | 0.779 | 0.0917 | 1.29 | $C_6H_{12}$ |
| A3 | 1-Hexane | 1.3880 | 1.3935 | 1.3854 | 47.9 | 0.673 | 0.0538 | 1.40 | $C_6H_{12}$ |
| A4 | Toluene | 1.4962 | 1.5076 | 1.4916 | 31.0 | 0.867 | 0.1620 | 2.76 | $C_7H_8$ |
| A5 | n-heptane | 1.3877 | 1.3865 | 1.3923 | 57.0 | 0.684 | 0.0525 | 1.17 | $C_7H_{16}$ |
| B1 | n-Decane | 1.4116 | 1.4166 | 1.4094 | 57.2 | 0.73 | 0.0774 | 1.24 | $C_{10}H_{22}$ |
| B2 | Cis-decaline | 1.4803 | 1.4862 | 1.4777 | 56.5 | 0.897 | 0.1461 | 1.47 | $C_{10}H_{18}$ |
| B3 | Perhydrofluorene | 1.5015 | 1.5079 | 1.4989 | 55.7 | 0.920 | 0.1673 | 1.53 | $C_{13}H_{22}$ |
| C1 | Decamethyltetra-siloxane | 1.3894 | 1.3949 | 1.3871 | 49.9 | 0.854 | 0.0552 | 1.34 | $C_{10}H_{30}O_3Si_4$ |
| C2 | Octamethylcyclo-tetrasiloxane | 1.3962 | 1.4016 | 1.3940 | 52.1 | 0.956 | 0.0620 | 1.31 | $C_8H_{24}O_3Si_4$ |

In table 1, Group A shows some alkanes with a chain of 6 carbon-atoms. The linear n-hexane (A1) has a difference in refractive index with the KCL-solution of only 0.0404. Making the chain cyclic (A2) more than doubles this difference to 0.0917, while the Abbe number decreases only from 57.6 to 56.8. For comparison, 1-hexene is given. 1-Hexene can be compared with n-hexane, but has a double bound at the first C-atom. Double bonds increase the refractive index, but they do not keep the Abbe number high: the index difference 0.0538 is a little bit higher than for n-hexane, but the Abbe number decreases markedly to 47.9. This clearly indicates that, regarding dispersion, making a chain cyclic is a much better way to increase the refractive index than making a double bond. Toluene has a cyclic chain and three double bonds. This leads to a much higher refractive index difference (0.1620) in comparison to n-heptane that also has 7 carbon-atoms. It however makes the Abbe number unacceptably low (31.0).

In group B the linear n-decane is improved by turning it into cis-decaline. This fluid consists of molecules with two cyclic rings. The refractive index raises strongly, while the Abbe number remains high! Perhydrofluorene, with 3 cyclic rings, has an even higher refractive index, with still a high abbe number.

In group C a linear silicone oil is compared with a cyclic silicone oil. The refractive index raises for the cyclic oil, and even its Abbe number is higher than for the linear oil.

A positive side-effect is the increase in density for cyclic molecules. Preferably, the polar and non-polar fluids are density-matched. However, usually non-polar fluids are less dense than polar fluids. Changing chains from linear to cyclic decreases the density difference.

Figure 2:
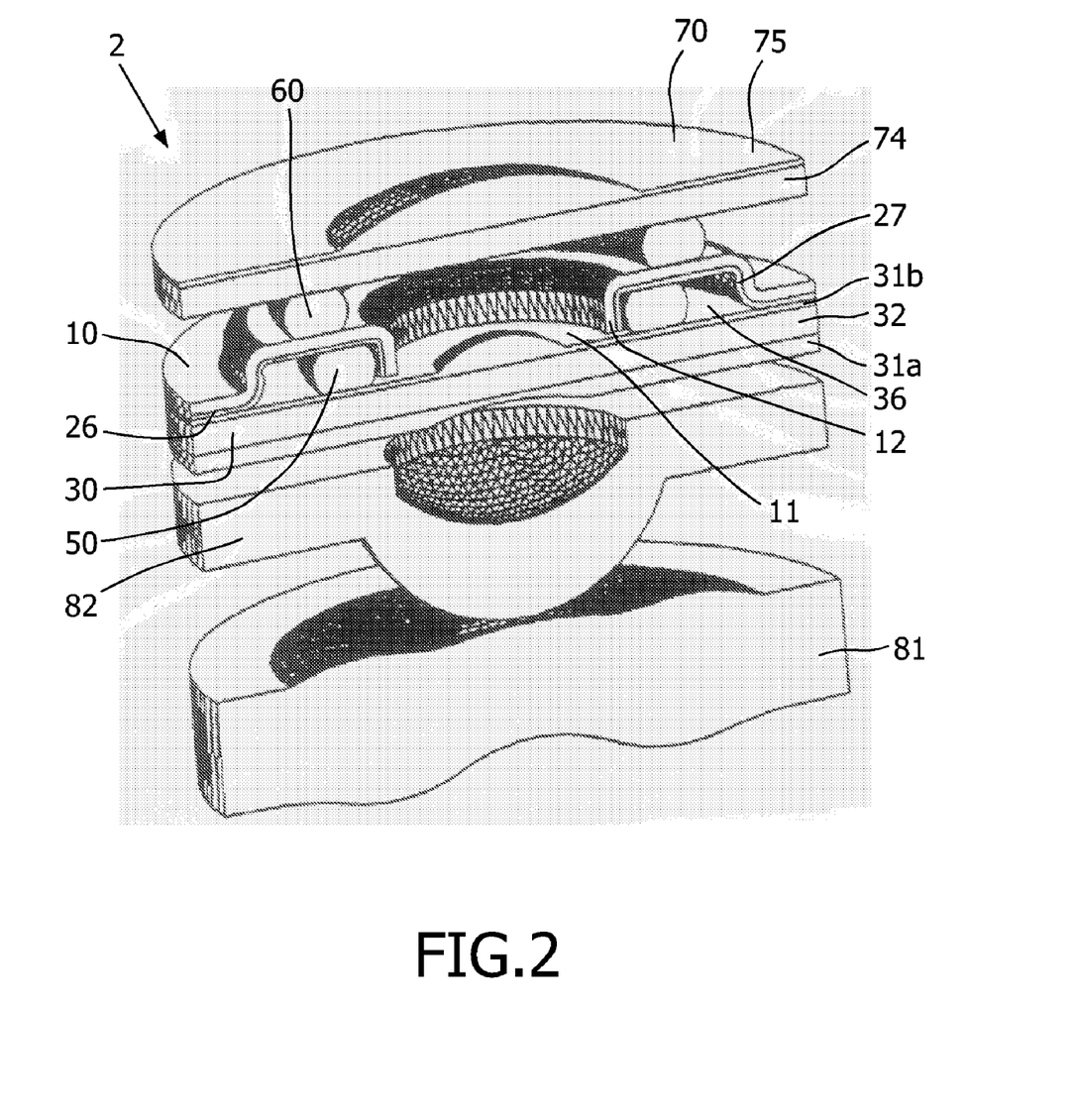
FIG. 2 is an diagrammatic, exploded view of the lens.

FIG. 2 diagrammatically shows an exploded view of a second embodiment of the variable focus lens 2. The bottom lens member 30 comprises a replica lens having three layers. The replica lens comprises a glass base plate 32, which is sandwiched between a plastic bottom lens layer 31a of which a central portion constitutes a concave lens body, and a plastic top lens layer 31b of which a central portion constitutes a convex lens body. Further, in the shown example, the top lens member 70 also comprises a replica lens. This replica lens of the top lens member 70 comprises a glass base plate 74 and a plastic top lens layer 75 of which a central portion constitutes a convex lens body. It is observed that the replica lenses 31a, 31b at opposing sides of the glass plate 31 need not to have the as anti-reflection coatings and UV-absorption coatings in a sputtering treatment. Suitable anti-reflection coatings comprise titanium oxide, silicon oxide and/or tantalum oxide. In a more specific embodiment, the replica lens is an liquid crystalline lens. Such a liquid crystalline lens has a solid polymer body and a switchable liquid crystalline mixture. A linear polarizer is suitably provided on top of the lens. Since a conventional polarizer typically absorbs about 50% of the light, two liquid crystalline cells may be superimposed—one for each polarization direction. Preferably, the liquid crystalline materials are oriented perpendicularly to each other. The manufacture of such a liquid crystalline lens is described in the non-prepublished application WO-IB2005/50270 (PHNL040107) which is included herein by reference.

A feature of the lens 2 is that the body 10 itself may be used as an electrical connector of the lens 2, wherein it is not necessary that an additional element for contacting the body 10 is applied. In order to avoid short-circuiting between the body 10 and the layer 37 of the bottom lens member 30, a bottom surface 26 of the body 10 is covered by an electrically insulating layer 27, at least at the areas where the body 10 rests on the bottom lens member 30. The shown body 10 is designed such as not to contact the top surface 36 of the bottom lens member 30 at an end of an inner portion 12 of the body 10.

The body 10 may comprise clamping arms (not shown in FIG. 2) for fixing the bottom lens member 30. However, it is also possible that clamping means for clamping the bottom lens member 30 against the body 10 are provided, which are not formed as an integral part of the body 10. The top lens member 70 may be fixed with respect to the body 10 in any suitable way, for example also by means of clamping means.

Besides the connector, which is constituted by the body 10, the variable focus lens 2 preferably includes another connector (not shown in FIG. 2), which is in contact with the electrically conducting layer 37 of the bottom lens member 30, in order to be in contact with the water through this layer 37. This connector may be shaped and arranged in any suitable way, wherein it is important that the connector does not contact the body 10.

The variable focus lens 2 may be applied in hand-held apparatus, such as mobile phones and optical scanning devices for use in digital recording equipment. A number of lenses 2 may be positioned in a row, wherein the through-holes 11 of the lens 2 are aligned with respect to each other, in order to create a zoom lens. Although the lens 2 is shown to have lens parts at both sides of the glass plate 30, there is no need, and it is sufficient that these are provided at the outside only. The lens 2 according to the present invention are particularly intended for application in a camera, which further comprises an image sensor and an interconnecting body, wherein the interconnecting body comprises electrically conductive tracks arranged on a first surface and a second surface of the interconnecting body, and wherein the electrically conductive tracks are shaped such as to be able to establish a connection between both the image sensor and the variable focus lens 2 to driver electronics therefore, or to contact pads. The camera may be part of the above-mentioned hand-held apparatus, which may further comprise input means, information processing means and display means.

It is observed that the invention is not limited to the specific package as shown in the Figs. Other packages, such as those known from WO-A 2004/99847 may be used alternatively.

Figure 3:
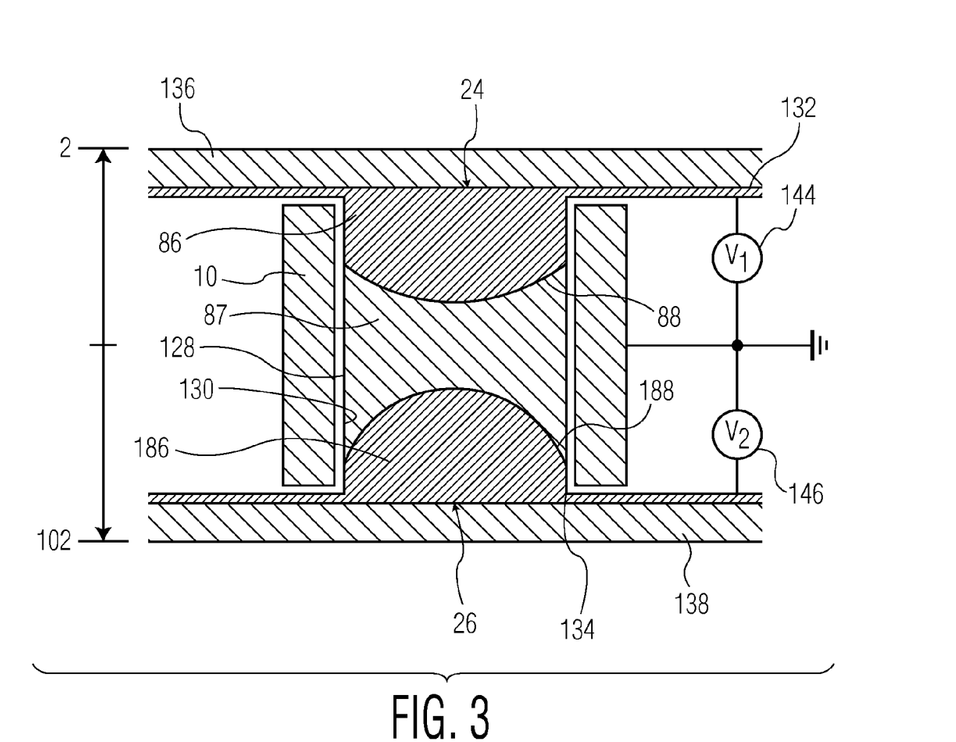
FIG. 3 is a diagrammatic view of an electrowetting zoom lens.

FIG. 3 shows an example of an electrowetting zoom lens comprising a first and a second electrowetting lens elements 2, 102. This device comprises a cylindrical body 10 of conductive material. The body 10 is coated with an insulating layer 128. The inner side of the cylindrical body 10 is provided with a fluid contact layer 130. The conductive cylinder 10 forms a common first electrode for the lens elements 2 and 102. The second electrode of the first lens element 2 is constituted by an annular conductive layer 132 having a central transparent area for transmitting radiation. A conductive layer 134 at the lower side forms the second electrode of the second lens element 102. Transparent layers 136 and 138 may cover the conductive layers 132 and 134, respectively. The central portion of the cylinder is filled with a transparent and non-conductive liquid or vapor 87, i.e. an oil comprising a compound with an aliphatic ring structure. At each side of the oil 87, a first transparent and conductive liquid 86, 186 is present, which liquid has a lower refractive index than the—second—non-conductive liquid 87. The conductive liquid is in this example a salt solution, for instance of 0.1 M KCl. The non-miscible fluids at the upper side are separated by a first meniscus 88, which forms the first variable-focus lens element. The fluids 186 and 87 at the lower side are separated by a second meniscus 188, which forms the second variable focus lens element. The curvatures of the menisci and thus the focal distances of the lens elements 24, 26 can be changed independently from each other by means of controllable voltage sources 144 and 146, respectively.

According to the invention, the menisci are set in such a manner, that they are flat in a position half way between the two extreme zoom configurations. (WIDE, TELE). We call this in between position half zoom (HALF). In this half zoom position, the menisci are flat, and the fluid focus lenses are substantially color aberration free. As a consequence, the color aberration in both extreme zoom positions will be of opposite sign. This is particularly suitable in combination with the second, non-conductive fluid of the invention including a compound with an aliphatic ring-structure. However, principally, it is not limited thereto.

In a more preferred case the situation where both menisci are both flat should lay in between the WIDE and HALF configuration. The reason for this is that in the WIDE configuration the rays pass through the system with the largest angles resulting in general in higher chromatic aberrations than in the TELE configuration with smaller angles for the beam.

Figure 4:
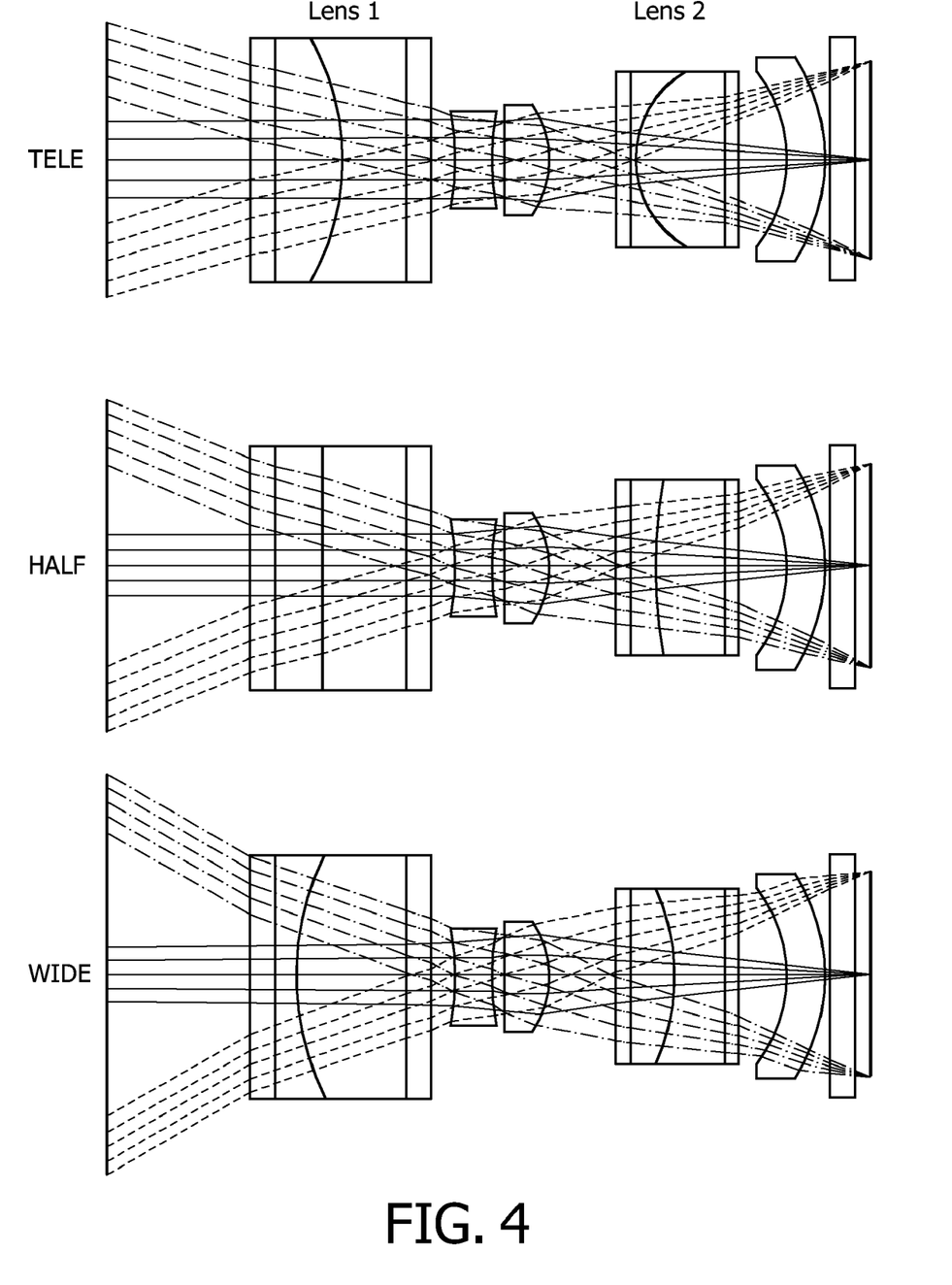
FIG. 4 shows a picture of some states of the electrowetting zoomlens.

FIG. 4 shows an example of a zoomlens in three different configurations: WIDE, HALF, TELE. In the WIDE configuration, the field of view is 56 degrees, in the HALF configuration 42 degrees and in the TELE configuration 32 degrees. The zoom lens of this embodiment comprises two separate electrowetting lenses. Two aspherical plastic lenses are present between the electrowetting lenses. A stop is situated between these two plastic lenses. A further aspherical plastic lens is positioned on the side, at which an image sensor may be provided. For each electrowetting lens the first fluid is a conducting liquid having a refractive index of 1.33 and an Abbe number V=57.6. The second fluid is an electrically insulating fluid. In this example both electrowetting lenses contain the same fluids. A property revealing the chromatic aberration present in the zoom lens is the difference in lateral position of a spot formed when using light of wavelength of 450 nm (blue), 550 nm (green) and 650 nm (red). Due to chromatic aberration these spot will not coincide but be shifted with respect to each other.

In table 2 the relative lateral shift of the blue and red spot with respect to the green spot is given in the TELE and WIDE configurations when using different electrically insulating fluids. The first electrically insulating fluid has a refractive index of n=1.50 and Abbe number of V=31.0, corresponding to Toluene in table 1). The second example has n=1.50 and V=38.2, and corresponds to a prior art silicone oil. The third example has n=1.50 and V=55.7 (corresponding to Perhydrofluorene in table 1). In other words, the first and second example are not according to the invention, and the third is. The shifts are measured in micrometers.

TABLE 2

| | | TELE | | WIDE | |
|---|---|---|---|---|---|
| Fluid | Abbe number | Shift green/blue | Shift green/red | Shift green/blue | Shift green/red |
| A4 | 31.0 | −15.7 μm | 7.6 μm | 24.6 μm | −13.1 μm |
| Prior art | 38.2 | −8.5 μm | 4.1 μm | 19.2 μm | −10.6 μm |
| B3 | 55.7 | 2.2 μm | −1.3 μm | 12.0 μm | −6.9 μm |

Table 2 demonstrates that electrically insulating fluids having high Abbe number result in lower chromatic aberration. This can be achieved by choosing a compound that includes an aliphatic ring-shaped structure as the second, electrically insulating fluid.

The invention claimed is:

1. An optical electrowetting element comprising a fluid chamber with a first, electrically susceptible fluid and a second, electrically less susceptible fluid, which fluids are mutually at least substantially immiscible and separated over a meniscus,
characterized in that the second fluid comprises a compound that includes an aliphatic ring-shaped structure.

2. An electrowetting element as claimed in claim 1, wherein the compound is an alkane with at least one ring structure.

3. An electrowetting element as claimed in claim 2, wherein the alkane comprises two or more ring structures.

4. An electrowetting element as claimed in claim 1, wherein the ring-shaped structure is a siloxane.

5. An electrowetting element as claimed in claim 1, wherein the second fluid comprises a further apolar or insulating compound in addition to the compound with the aliphatic ring-shaped structure, said further apolar compound being present in an amount of at least 50% by weight.

6. An electrowetting element as claimed in claim 1, wherein the element is a lens.

7. An electrowetting element as claimed in claim 6, wherein the element is a zoom lens, which comprises a first and a second meniscus.

8. A lens system comprising an electrowetting zoom element with a first and a second meniscus, optionally as claimed in claim 7, wherein the first and the second menisci are positioned along an optical axis and each have a curvature with respect to a plane normal to the optical axis, and wherein the curvatures of the first and second meniscus are oriented in opposite directions along the optical axis in at least one state of the lens system.

9. A lens system comprising at least one element according to claim 6.

10. A lens system as claimed in claim 9 further comprising a second electrowetting element provided with a fluid chamber with a first, electrically susceptible fluid and a second, electrically less susceptible fluid, which fluids are mutually at least substantially immiscible and separated over a meniscus.

11. A lens system of a first and a second electrowetting optical element, optionally as claimed in claim 10, wherein the menisci of the first and second element are positioned along an optical axis and each have a curvature with respect to a plane normal to the optical axis, and wherein the curvatures of the menisci of the first and the second element are oriented in opposite directions along the optical axis in at least one state of the lens system.

12. A method of driving a lens system as claimed in claim 11.

13. An electronic device comprising an electrowetting element as claimed in claim 1.

* * * * *